Figure 6:
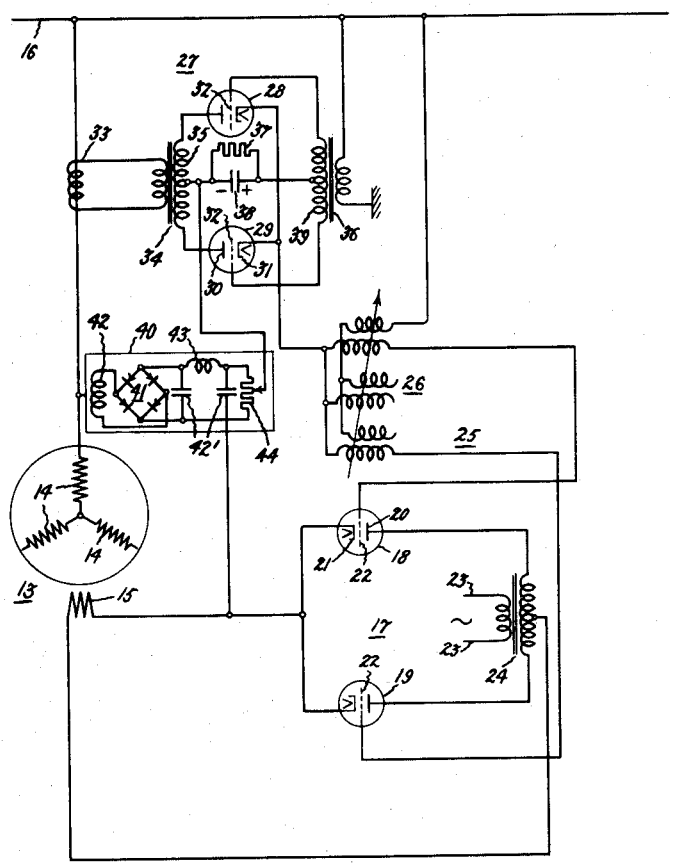

March 26, 1940.         R. MODLINGER         2,195,116
ELECTRIC VALVE SYSTEM
Filed June 2, 1938         3 Sheets-Sheet 1
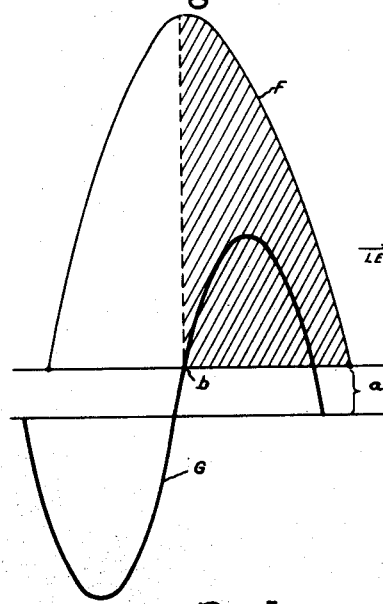
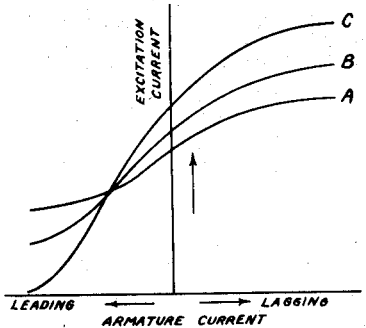
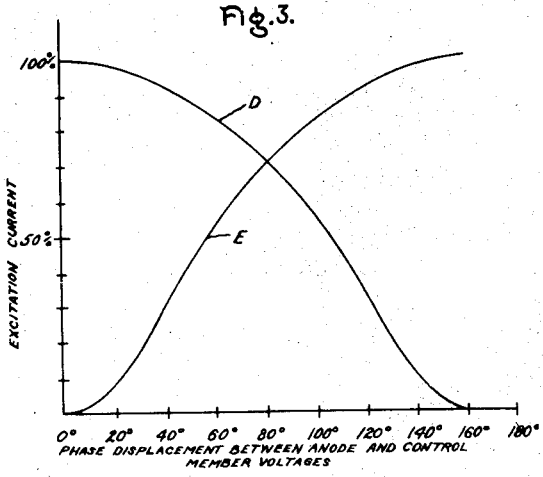
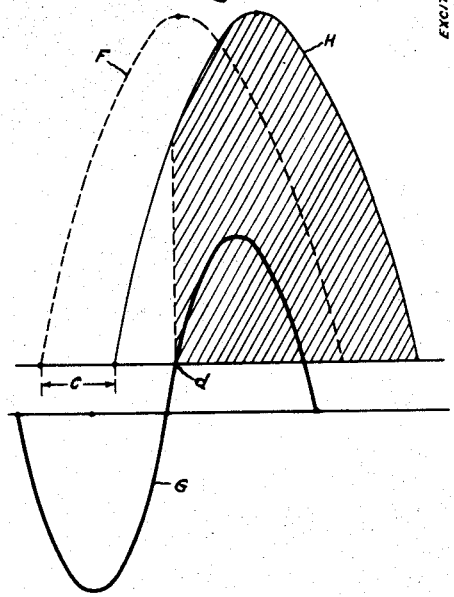
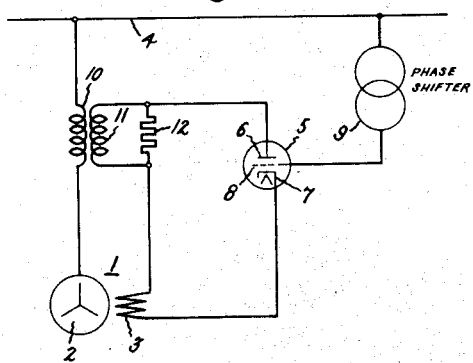
Inventor:
Richard Modlinger,
by Harry E. Dunham
His Attorney.

March 26, 1940.  R. MODLINGER  2,195,116
ELECTRIC VALVE SYSTEM
Filed June 2, 1938  3 Sheets-Sheet 2

Inventor:
Richard Modlinger,
by Harry E. Dunham
His Attorney.

March 26, 1940.  R. MODLINGER  2,195,116
ELECTRIC VALVE SYSTEM
Filed June 2, 1938  3 Sheets-Sheet 3

Inventor:
Richard Modlinger,
by Harry E. Dunham
His Attorney.

Patented Mar. 26, 1940

2,195,116

UNITED STATES PATENT OFFICE 2,195,116

ELECTRIC VALVE SYSTEM

Richard Modlinger, Berlin, Germany, assignor to General Electric Company, a corporation of New York Application June 2, 1938, Serial No. 211,453
In Germany June 14, 1937

8 Claims. (Cl. 171—119)

My invention relates to electric valve circuits and more particularly to electric valve circuits for exciting dynamo-electric machines.

In excitation systems for dynamo-electric machines of the synchronous type, it is of material consequence to control the excitation current in response to the quadrature current transmitted by the armature winding of the machine. For example, considering an alternating current generator of the synchronous type which is supplying an inductive load, excitation current must be increased as the load current increases and the field current must be increased as the power factor of the load decreases if it is desired to maintain a constant voltage output characteristic. Furthermore, where an alternating current generator of the synchronous type is energizing a load circuit, the power factor of which varies within the leading and lagging regions, it is of importance to decrease the energization of the field or excitation winding within the leading region if the terminal voltage of the machine is to be maintained at the desired value. Heretofore, the prior art arrangements for effecting energization of the excitation circuit of synchronous machines by means of electric valve apparatus have operated to maintain a constant output voltage of the machine by utilizing the magnitude of the output voltage of the machine as the controlling influence, or by utilizing a phase relationship determined by the current transmitted in conjunction with the output voltage as a controlling influence, irrespective of the excitation characteristics of the machine. In accordance with the teaching of my invention, which is described hereinafter, I provide a new and improved electric valve system for dynamo-electric machines in which the phase of the armature current with respect to the terminal voltage of the machine is utilized to control the electric valve apparatus so that its output characteristic simulates the excitation current-armature current characteristic of the synchronous machine for a constant output voltage throughout the lagging and leading regions of the armature current.

It is an object of my invention to provide new and improved excitation circuits for dynamo-electric machines.

It is another object of my invention to provide new and improved electric valve excitation systems for dynamo-electric machines of the synchronous type.

It is a further object of my invention to provide new and improved voltage regulating systems for dynamo-electric machines.

It is a still further object of my invention to provide new and improved electric valve systems.

It is a still further object of my invention to provide new and improved regulating systems.

In accordance with the illustrated embodiments of my invention, I provide new and improved electric valve excitation systems for dynamo-electric machines of the synchronous type. Electric valve apparatus transmits variable amounts of unidirectional current to a field or excitation winding to maintain the terminal voltage of the machine at a substantially constant value. The electric valve means includes an anode, a cathode and a control member, and the phase of the anode-cathode voltage of the electric valve means varies as the armature current of the machine varies, and the periodic voltage impressed on the control member is fixed in phase relative to the terminal voltage of the machine or fixed in phase relative to the voltage of an associated alternating current circuit which is connected to the armature winding. By shifting the phase of the anode-cathode voltage relative to the control member voltage, the average output voltage or current of the electric valve means varies in accordance with the power factor of the armature current and simulates the excitation current-armature current characteristic of the machine for a constant output voltage throughout the lagging and leading regions of the armature current for a given value of the armature current.

In another embodiment of my invention, a main or power electric valve rectifier transmits variable amounts of unidirectional current to the field or excitation winding of a synchronous machine, and the conductivity of the rectifier is controlled by a characteristic determining circuit such as that explained above. The characteristic determining circuit generates a variable unidirectional bias voltage which is impressed on control members of the main or power rectifier, so that the field winding of the machine is variably energized to maintain the armature voltage at a substantially constant value in accordance with the power factor of the armature current of the machine.

In a further embodiment of my invention diagrammatically illustrated, the field or excitation winding of a synchronous alternating current generator is variably energized by a main electric valve rectifier of the controlled type and in which a characteristic determining circuit generates a variable unidirectional bias voltage which varies as the power factor of the armature current and in which two components of alternating voltage are introduced into the excitation or control circuit for the main or power electric valve rectifier. These components of alternating voltage act in series relation. One of these components is derived from and varies as the terminal voltage of the synchronous generator and the other is derived from an independent source of alternating voltage correlated in phase and frequency with respect to the voltage of the alternating current generator and acts as a standard for the first alternating component of voltage. This arrangement serves to increase the speed of response and the precision of control of the electric valve rectifier.

Figures 7, 8:
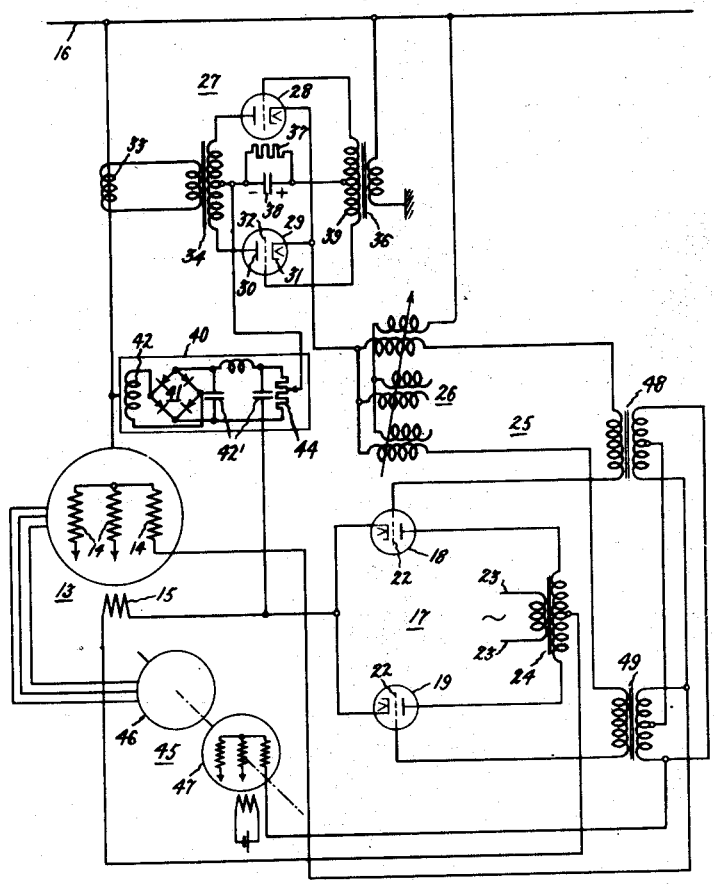

For a better understanding of my invention, reference may be had to the following description taken in connection with the accompanying drawings, and its scope will be pointed out in the appended claims. Fig. 1 is a diagrammatic illustration of one embodiment of my invention, and Figs. 2-5 represent certain operating characteristics thereof. Fig. 6 diagrammatically illustrates an embodiment of my invention in which a control circuit and a main power rectifier are employed to energize the excitation circuit of a synchronous machine; Fig. 7 is a modification of the arrangement shown in Fig. 6, and Fig. 8 represents certain operating characteristics of the control circuit for the power electric valves in the arrangement of Fig. 7.

In Fig. 1 of the accompanying drawings, there is diagrammatically illustrated a simplified embodiment of my invention as applied to an excitation system for a dynamo-electric machine of the synchronous type. While the arrangement of Fig. 1 is shown as of the single-line or single-phase type, it is to be understood that it may represent a polyphase system. A dynamo-electric machine 1 of the synchronous type having an armature winding 2 and a field winding 3 is connected to an alternating current circuit 4. The alternating current circuit 4 may be of the polyphase type. The field winding 2 is supplied variable amounts of unidirectional current by an electric valve means 5 which is preferably of the type employing an ionizable medium, such as a gas or a vapor, and which includes an anode 6, a cathode 7 and a control member 8. A periodic voltage, such as an alternating voltage of fixed phase displacement relative to the terminal voltage of the synchronous machine 1 or relative to the alternating current circuit 4, is impressed on the control member 8 by any suitable phase shifter 9. It is to be understood that the phase shifter 9 may be any of the types well known in the art such as a rotary phase shifter, or a phase shifting device of the static impedance type.

In order to control the relative phase displacement between the anode-cathode and control member voltages of the electric valve means 5 so that the output characteristic of the electric valve means 5 simulates the excitation current-armature current characteristic of the synchronous machine 1, I employ a means, such as a current transformer 10, which is responsive to the armature current of machine 1 and which produces across a secondary winding 11 thereof an alternating voltage the phase of which varies as the phase of the armature current. A suitable impedance, such as a resistance 12, may be connected across the terminals of secondary winding 11 to maintain the voltage of the current transformer 10 within a safe range of operating values. The output voltage of the current transformer 10 is impressed across the anode-cathode circuit of the electric valve means 5. Due to the fact that the phase of the anode-cathode voltage of the electric valve means 5 varies as the phase of the armature current of machine 1 and due to the fact that the voltage impressed on the control member 8 is of fixed phase displacement, the output characteristic of the electric valve means 5 is similar in form to the excitation current-armature current characteristic of the dynamo-electric machine 1.

The way in which the output characteristic of the electric valve means 5 is utilized to effect the desired control of the energization of the field winding 3 of machine 1 may be better understood by considering the operating characteristics represented in Figs. 2-5. Considering Fig. 2 in particular, curves A, B and C represent the excitation current-armature current characteristic of the dynamo-electric machine 1, assuming armature currents of increasing value in the order named. It will be noted that these curves may be considered of sine or cosine wave form.

Curves D and E of Fig. 3 represent the output characteristics of electric valve means of the type employing an ionizable medium, such as the electric valve means 5. More specifically, the curve D represents the average output voltage of the electric valve means 5 as the phase of the control member voltage is retarded with respect to the anode-cathode voltage. Likewise, curve E represents the output voltage of an electric valve means, of the type employing an ionizable medium, when the displacement between the anode-cathode and control member voltages is progressively decreased from an initial phase displacement. It will be noted that the curves D and E also may be represented, respectively, by cosine and sine curves.

To explain the manner in which the output voltage of electric valve means 5 and hence the current transmitted to the excitation winding 3 varies in accordance with the phase of the armature current of machine 1, reference may be had to Figs. 4 and 5. Curve F represents the voltage appearing across the terminals of the secondary winding 11 of current transformer 10, or, in other words, represents the anode-cathode voltage of the electric valve means 5. Curve G represents the voltage impressed on the control member 8 by means of the phase shifter 9 and is adjusted so that the voltage of the control member 8 lags the anode voltage by an appreciable amount. The distance $a$ represents a negative unidirectional bias which may be impressed on the control member 8 by means (not shown). If it be assumed that the electric valve means 5 has a zero voltage characteristic, that is, if it be assumed that the control member 8 renders the electric valve means 5 conductive when its potential is at the potential of the cathode 7, the electric valve means will be rendered conductive at time $b$ and the electric valve means 5 will conduct current during an interval of time proportional to the shaded area under curve F. The rotary phase shifter 9 is initially adjusted so that for a particular armature current, the unidirectional current supplied by the field winding 3 excites the machine 1 to maintain a predetermined terminal voltage. If it be assumed that the current transmitted by the generator 1 becomes more lagging and is retarded by an angle c to the position represented by the curve H, the anode-cathode voltage and the control member voltage of the electric valve means 5 are brought more nearly in phase and the electric valve means 5 is rendered conductive at the time d and conducts current proportional to the shaded area under curve H. It will be observed that the output voltage of the electric valve means 5 and hence the current transmitted to excitation winding 3 are substantially increased in response to the decrease in the power factor of the armature current, thereby tending to compensate for the increase in the armature reaction occasioned by a more lagging current. The shift in phase of the anode-cathode voltage of the electric valve means 5 utilizes the characteristic of the electric valve means 5 as represented by curve E in Fig. 3, which also represents the general shape of the excitation current-armature current characteristic of the machine 1.

Referring now to the embodiment of my invention diagrammatically shown in Fig. 6, a dynamo-electric machine 13 of the synchronous type having armature windings 14 and a field or excitation winding 15 is connected to an alternating current circuit 16 which may be of the polyphase type. While various parts of the arrangement shown in Fig. 6 are shown in single line form, it is to be understood that the arrangement is applicable to polyphase circuits. Variable amounts of unidirectional current are transmitted to the field winding 15 by means of a rectifier 17 which comprises a pair of electric valve means 18 and 19 which are preferably of the type employing an ionizable medium, such as a gas or a vapor. Each of the electric valve means comprises an anode 20, a cathode 21 and a control member or grid 22. The rectifier 17 may be energized from any suitable source of alternating current 23 or to circuit 16 and a transformer 24 may be interposed between the circuit 23 and the electric valves 18 and 19.

I provide a control circuit 25 for energizing the control members 22 of the electric valve means 18 and 19. To introduce into the control circuit 25 an alternating component of voltage adjustable in phase with respect to the anode-cathode voltage of the electric valves 18 and 19, I provide any suitable phase shifting arrangement such as a rotary phase shifter 26. Of course, it is to be understood that I may employ other suitable arrangements for effecting phase adjustment of the alternating component of voltage, such as phase shifting devices of the static impedance type.

I provide a characteristic determining circuit 27 which produces a variable unidirectional voltage which varies in accordance with the power factor of the armature current of the dynamo-electric machine 13. This unidirectional voltage is impressed on the control members 22 of the electric valve means 18 and 19 through the rotary phase shifter 26. The average output voltage of the circuit 27 simulates the excitation current-armature current characteristic of the machine 13 throughout the leading and lagging regions of the armature current and may be represented by the aforementioned curves shown in Fig. 3. Circuit 27 comprises a pair of electric valves 28 and 29 which are preferably of the type employing an ionizable medium and each of which comprises an anode 30, a cathode 31 and a control member 32. The anode-cathode voltages of the electric valves 28 and 29 vary in phase with the armature current of the generator 13 and may be obtained by means of a current transformer 33 and a transformer 34 which is energized from the current transformer 33. Transformer 34 is provided with a secondary winding 35, the terminals of which are connected to anodes 30 of electric valves 28 and 29. As a means for impressing an alternating voltage on the control members 32 of the electric valves 28 and 29, I employ a transformer 36 which may be energized directly from the alternating current circuit 16 or may be energized through a phase shifting arrangement (not shown). A suitable biasing means, such as a parallel connected resistance 37 and a capacitance 38, may be connected in series relation with secondary winding 39 of transformer 36, so that the resultant voltage impressed on the control members 32 is the resultant of the unidirectional voltage and an alternating voltage.

A suitable source of biasing potential 40 is connected to the control circuit for electric valves 28 and 29. Circuit 40 may be any of the arrangements well known in the art and may comprise a full wave rectifier 41 which is energized from the armature winding 14 of machine 13 through a transformer 42. The output voltage of the rectifier 41 may be filtered by means of a circuit including capacitances 42' and an inductance 43. A voltage divider 44 in connected across the output circuit of the rectifier 41 and provides a convenient arrangement for adjusting the value of the unidirectional biasing potential impressed on control members 32.

The operation of the embodiment of my invention illustrated in Fig. 6 will be explained by considering the system when the dynamo-electric machine 13 is operating as a synchronous alternating current generator to transmit power to circuit 16. If it be assumed that the characteristics of the load supply are such that the magnitude of the armature current remains substantially constant and varies in phase, the excitation current-armature current characteristic may be represented by one of the curves of Fig. 2. The output voltage of circuit 27 varies in accordance with the curves shown in Fig. 3 and simulates the curves of Fig. 2. This unidirectional voltage is impressed on the control members 22 of electric valves 18 and 19 in the rectifier circuit 17 and varies the current transmitted to the field winding 15 in accordance with the power factor of the armature current of machine 13. Of course, it is to be understood that the resultant voltage impressed on the control members 22 of the electric valves 18 and 19 is the sum of the alternating component produced by phase shifter 26 and the unidirectional component produced by circuit 27. The output current of the electric valves 18 and 19 is increased as the electric valves are rendered conductive at earlier points in the positive half cycles of applied anode-cathode voltage, and, conversely, are decreased as the electric valves are rendered conductive at later points in the positive half cycles. In this manner, the excitation of the machine 13 is varied to maintain the terminal voltage constant.

The arrangement diagrammatically illustrated in Fig. 7 is similar in many respects to that shown in Fig. 6 and corresponding elements have been assigned like reference numerals. In the arrangement of Fig. 7, I provide an improved circuit for energizing the control members 22 of the electric valves 18 and 19 in the rectifier circuit 17 to increase the speed of response and the precision of control of the system. As a means for expediting the response of the rectifier 17 with respect to changes in voltage of the alternating current circuit 16 or with respect to the terminal voltage of the synchronous generator 13, I introduce into control circuit 25 a standard voltage against which the alternating component of voltage provided by the phase shifter 26 operates. This standard voltage may be an alternating voltage and, of course, must be of a substantially constant value. To obtain such an alternating reference voltage of substantially constant value, I provide a motor generator arrangement 45 including a synchronous motor 46 and a pilot synchronous generator 47. The synchronous motor 46, of course, may be energized from the machine 13. The output voltage of the pilot synchronous generator 47 is introduced into control circuit 25 through transformers 48 and 49. In this manner, the reference voltage and the voltage produced by the phase shifter 26 act in series relation. The phase of the reference alternating voltage with respect to the voltage produced by phase shifter 26 may be adjusted by the positioning of the rotor of the pilot generator 47 with respect to that of the synchronous motor 46.

In operation, the arrangement of Fig. 7 performs in substantially the same manner as that explained in connection with the arrangement of Fig. 6. However, the control circuit of Fig. 7 responds more rapidly to maintain the output voltage of the machine 13 at a constant value. The electric valves 18 and 19 of the rectifier circuit 17 transmit variable amounts of unidirectional current to the field winding 15. The conductivities of the electric valves 18 and 19, of course, are controlled by the resultant voltages impressed on control members 22. The resultant voltages impressed on control members 22 comprise three components. One of these components is a unidirectional component produced by the circuit 27; a second component is that produced by phase shifter 26, and a third component is that introduced into the control circuit by transformers 48 and 49. The magnitude of the component of the reference voltage introduced into control circuit 25 by transformers 48 and 49 remains fixed in phase and magnitude due to the fact that the pilot generator 47 is driven at a substantially constant speed and since the excitation circuit thereof is energized from a constant voltage source. The phase of the alternating reference voltage is preferably in opposition to the voltages provided by the phase shifter 26 and may be adjusted by the excitation of the pilot generator 47 to a value equal to that provided by the phase shifter 26 when the voltage of the alternating current circuit 16 is at the desired value to be maintained.

The operating characteristics shown in Fig. 8 may be referred to in explaining the manner in which the circuit of Fig. 7 operates. Curve J represents the anode-cathode voltage of one of the electric valves 18 or 19. Curve K represents the magnitude of the variable unidirectional biasing potential produced by circuit 27. Curve L represents the alternating reference voltage introduced into control circuit 25 by the pilot generator 47, and curve M represents the variable voltage introduced into control circuit 25 by the phase shifter 26 and which varies in accordance with the voltage of circuit 16 or in accordance with the terminal voltage of generator 13. Since the voltages produced by the pilot generator 47 and the phase shifter 26 are in phase opposition, the effect thereof will be neutralized so long as the voltage of circuit 16 maintains the predetermined value. However, if the voltage of circuit 16 deviates from this value there will be introduced into the control circuit 45 a resultant voltage which tends to control the conductivities of electric valves 18 and 19 to restore the voltage of circuit 16. For example, if the voltage of the alternating current circuit 16 increases above the desired value, the voltage introduced into control circuit 25 by phase shifter 26 will increase, effecting an increase in the negative direction of the resultant voltage impressed on control members 22 of electric valves 18 and 19, thereby rendering the electric valves 18 and 19 conductive at later times during the positive half cycles of applied anode-cathode voltage. In this manner, the current transmitted to field winding 15 will be decreased and the armature terminal voltage will be correspondingly decreased. The reverse operation takes place when the voltage of circuit 16 decreases below the predetermined value.

Circuit 27, of course, operates concurrently with the control circuit 25 to control the energization of field winding 15 in accordance with the power factor of the armature current supplied by machine 13.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current circuit, a dynamo-electric machine having an armature winding connected to said alternating current circuit and having an excitation winding, an electric valve means for controlling the energization of said excitation winding and comprising an anode, a cathode and a control member, and a control circuit for controlling said electric valve means so that its output characteristic simulates the excitation current-armature current characteristic of said machine for a constant output voltage throughout the lagging and leading regions of the armature current comprising means for energizing the anode-cathode circuit of said electric valve means solely in accordance with the current of said winding and means for energizing the control member in accordance with the voltage of said armature winding.

2. In combination, an alternating current circuit, a dynamo-electric machine having an armature winding connected to said alternating current circuit and having an excitation winding, and translating apparatus for energizing said excitation winding comprising an electric valve means having an anode, a cathode and a control member, means for impressing on said control member a periodic voltage of fixed phase displacement, and means for impressing across said anode and said cathode an alternating voltage which varies in phase in response to the current of said armature winding.

3. In combination, an alternating current circuit, a dynamo-electric machine having an armature winding connected to said circuit and having an excitation winding, an electric valve means for transmitting variable amounts of unidirectional current to said excitation winding, said electric valve means having an anode, a cathode and a control member, and means responsive to the power factor of the armature current for impressing on said control member a unidirectional potential to control the conductivity of the electric valve means and comprising an electric valve having an anode-cathode circuit energized in response to the current of said winding and a grid circuit energized in response to the voltage of said winding.

4. In combination, an alternating current circuit, a load circuit, electric translating apparatus for energizing said load circuit and comprising an electric valve means having an anode, a cathode and a control member, and an electric valve rectifying means for impressing on said control member a unidirectional voltage which varies in accordance with the power factor of said alternating current circuit and having an anode-cathode circuit energized in response to the current of said alternating current circuit and having a grid circuit energized in response to the voltage of said alternating current circuit.

5. In combination, an alternating current circuit, a load circuit, electric translating apparatus for energizing said load circuit and comprising an electric valve means having an anode, a cathode and a control member, means for impressing on said control member an alternating voltage having a predetermined phase displacement relative to the anode-cathode voltage of said electric valve means, and electric valve rectifying means for impressing on said control member a unidirectional voltage which varies in accordance with the power factor of said alternating current circuit and comprising an anode-cathode circuit energized in response to the current of said alternating current circuit and a grid circuit energized in accordance with the voltage of said alternating current circuit.

6. In combination, an alternating current circuit, a load circuit, electric translating apparatus for energizing said load circuit and comprising an electric valve means having an anode, a cathode and a control member, means for impressing on said control member a unidirectional voltage which varies in accordance with a predetermined electrical condition of said alternating current circuit, means for impressing on said control member an alternating voltage of substantially constant magnitude, and means for impressing on said control member a second alternating voltage which varies in accordance with a second predetermined electrical condition of said alternating current circuit, said alternating voltages being in substantial phase opposition.

7. In combination, an alternating current circuit, a load circuit, electric translating apparatus for energizing said load circuit and comprising an electric valve means having an anode, a cathode and a control member, a control circuit for energizing said control member comprising means for producing a unidirectional voltage which varies in accordance with the power factor of said alternating current circuit, means responsive to the voltage of said alternating current circuit for impressing a voltage on said control member and a source of reference voltage of substantially constant value connected to oppose the voltage of said last mentioned means.

8. In combination, an alternating current circuit, a load circuit, electric translating apparatus for energizing said load circuit and comprising an electric valve means having an anode, a cathode and a control member, a control circuit for energizing said control member to control the conductivity of said electric valve means, means for introducing into said control circuit a unidirectional voltage which varies in accordance with the power factor of said alternating current circuit, means for introducing into said control circuit an alternating voltage of predetermined phase relation relative to the anode-cathode voltage of said electric valve means and which varies in accordance with the voltage of said alternating current circuit, and means for introducing into said control circuit an alternating voltage of constant phase displacement and magnitude and being connected in phase opposition to the first mentioned alternating voltage.

RICHARD MODLINGER.